Patented Sept. 25, 1951

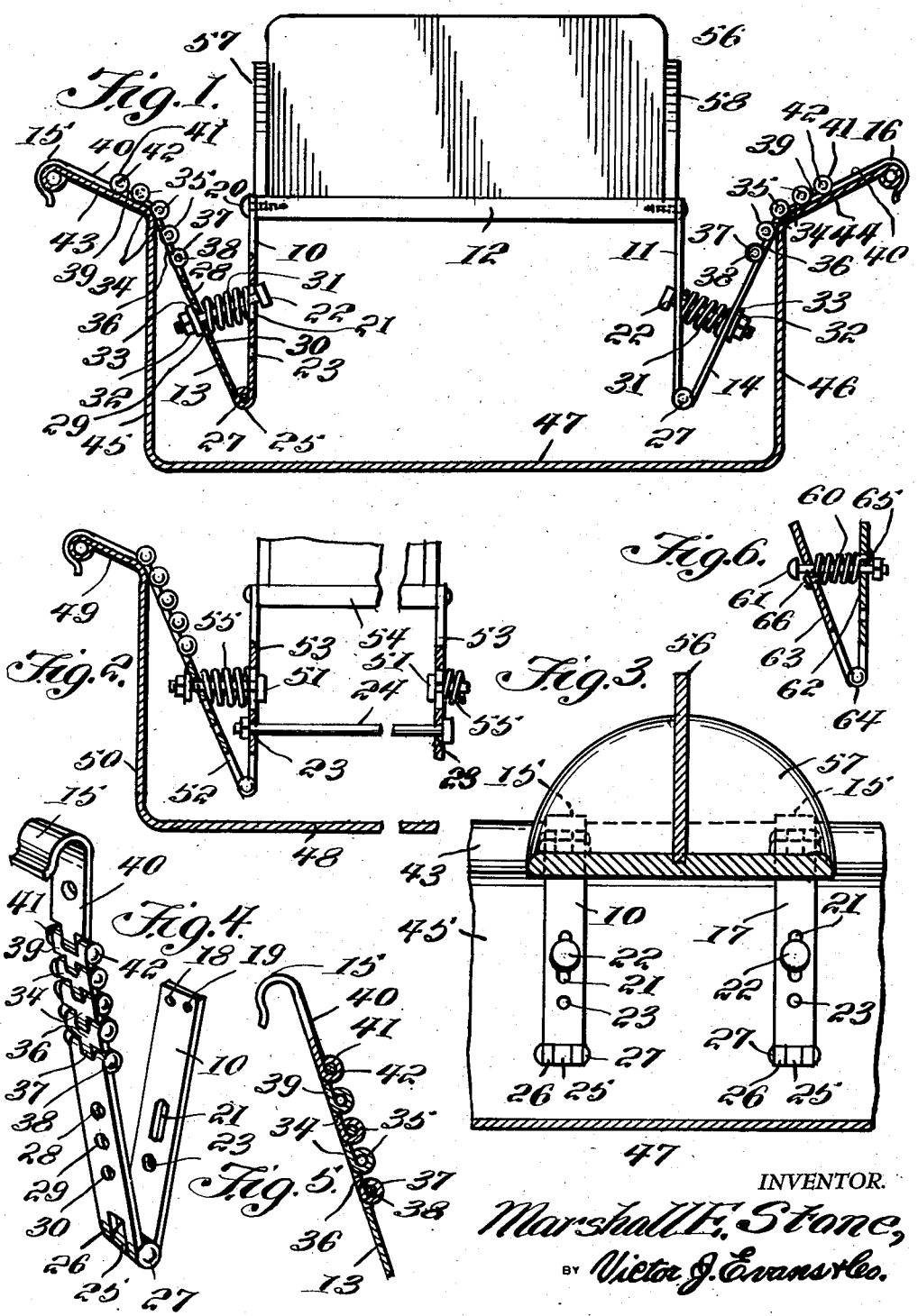

2,568,832

UNITED STATES PATENT OFFICE 2,568,832

WAGON AND TRUCK BODY SEAT

Marshall E. Stone, Monticello, Ky.

Application July 26, 1950, Serial No. 175,967

4 Claims. (Cl. 155—5)

This invention relates to seats and supports therefor particularly adapted for use in truck bodies of the pick-up type, and in particular a seat having downwardly extended struts at the corners with arms having spaced hinged sections therein pivotally connected to the lower ends of the struts, with stay bolts and springs resiliently holding the arms in spaced relation to the struts and with hooks on the upper ends of the arms.

The purpose of this invention is to provide means for supporting a seat between the walls of a truck body which is adjustable to truck bodies of different widths.

Various attempts have been made to place seats on the upper edges of the walls of truck bodies particularly where the trucks are used to carry workers to and from different points such as in construction work and for maintenance and emergency crews in combination with public utilities particularly such as telegraph and telephone lines. But because of the different shapes of the upper edges of the side walls of truck bodies and also because of the different widths of trucks it is difficult to provide a universal connection that may be used without mechanically changing parts thereof. With this thought in mind this invention contemplates seat supporting arms having hooks on the upper ends with the arms including hinge sections that make it possible for the arms to bend at different points and with the arms pivotally connected to struts on the seat and urged outwardly by springs.

The object of this invention is, therefore, to provide means for constructing a seat support whereby the positions of supporting arms may be extended or contracted without mechanically changing the parts thereof.

Another object of the invention is to provide a seat support that is adjustable to truck bodies of different sizes which may readily be installed on a truck body without changing parts of the body.

A further object of the invention is to provide flexible supporting arms for carrying seats in truck bodies which are of a simple and economical construction.

With these and other objects and advantages in view the invention embodies arms with hooks on the upper ends and having spaced hinge sections spaced from the hooks with means for pivotally connecting the lower ends of the arms to struts extended downwardly from a seat and with springs positioned on stay bolts extended through the arms and struts, the springs being positioned between the surfaces of the arms and struts.

Other features and advantages of the invention will appear from the following description taken in connection with the drawings wherein:

Figure 1 is a front elevational view of the seat and support with the supporting arms positioned on the side walls of the truck body and with parts broken away and shown in section.

Figure 2 is a similar view showing one side of the seat support illustrating the stay bolts between the arm and strut in the horizontal position and showing a modification wherein a tie rod connected the lower ends of the struts.

Figure 3 is a cross section through the seat shown in Figure 1 with parts of the truck body broken away.

Figure 4 is a detail illustrating one of the flexible supports.

Figure 5 is a longitudinal section through one of the supporting arms illustrating the construction of the base hinge sections therein.

Figure 6 is a view showing a modification wherein the ends of the spring are attached to the arms of the support.

Referring now to the drawings wherein like reference characters denote corresponding parts the improved seat of this invention includes struts 10 and 11 extended downwardly from the forward edge of a seat 12 with the lower ends of the struts pivotally connected to arms 13 and 14 and with the upper ends of the arms provided with hooks 15 and 16.

Similar supports as indicated by the numeral 17 are provided at the rear edge of the seat 12 and as the supports at the four corners of the seat are duplicates the same reference numerals will be used for the details of each.

The struts, as indicated by the numeral 10 in figure 4 are provided with openings 18 and 19 at the upper end for screws 20, an elongated slot 21 for a stay bolt 22, and an opening 23 for a brace or tie rod as indicated by the numeral 24 in Figure 2. The brace 24 may or may not be used as may be desired.

The hub 25 on the lower end of the support or strut 10 is pivotally connected to a hub 26 on the lower end of the arm 13 by a pin 27. The arm 13 is provided with spaced openings 28, 29, and 30 that are positioned to engage the end of the stay bolt whereby, as illustrated in Figure 1 the stay bolt is inserted through the slot 21 of the strut and through the opening 29 of the arm with a spring 31 positioned on the bolt and between the arm and strut and the parts are held in spaced relation by a nut 32 threaded on the outer end of the bolt 22. A washer 33 may also be provided between the nut and outer surface of the arm 13.

As illustrated in Figure 5 the upper section of the arm 13 is provided with hinge sections 34 each of which is connected by a hinge 35 with a lower section 36 connected to the arm 13 by a hinge 37 with a pin 38 therein and with an upper section 39 pivotally connected to the upper end 40 of the arm by a hinge 41 with a pin 42 therein. The hook 15 is positioned on the upper end of the end section 40.

With the parts arranged in this manner the arm will bend at any suitable point corresponding with one of the hinge sections whereby the seat will fit a truck body regardless of the width of the flanges 43 and 44 on the upper edges of the side walls 45 and 46, respectively, of the truck body 47.

In the modification illustrated in Figure 2 the seat support is used on a truck body 48 having a comparatively narrow flange 49 on the upper edge of a wall 50 and in this design the arms bend at the point where the upper hinge section is positioned and the stay bolt 51 is extended through an upper opening, corresponding with the opening 28 in the arm 52 of the support, the lower end of which is pivotally connected to a strut 53 on a seat 54. In this design the stay bolt is provided with a spring 55 similar to the spring 31.

It will be understood that a seat of any suitable type may be used and the seat, as illustrated in Figures 1 and 3 which is provided with a centrally positioned back 56 and end panels 57 and 58, is only typical.

In the design shown in Figure 6 a spring 60 is provided on a bolt 61 between a strut 62 similar to the strut 10 and an arm 63 that is connected to the end of the strut by a hinge 64. In this design one end of the spring is secured to the strut 62, at the point 65 and the other to the arm 63 at the point 66. It will be understood that the spring may be provided in tension or compression as may be desired.

It will be understood that other modifications may be made in the design and arrangement of the parts without departing from the spirit of the invention.

What is claimed is:

1. A seat support comprising vertically disposed depending struts carried by a seat, upwardly and outwardly extended arms having hooks on the upper ends pivotally mounted on the lower ends of the struts, said arms having flexible sections therein, and means limiting outward movement of the arms.

2. A seat support comprising vertically disposed depending struts carried by a seat, upwardly and outwardly extended arms having hooks on the upper ends pivotally mounted on the lower ends of the struts, said arms having flexible sections therein, stay bolts extended through the struts and arms limiting outward movement of the arms and springs on the stay bolts urging the arms outwardly.

3. A seat support comprising vertically disposed depending struts carried by a seat, upwardly and outwardly extended arms having hooks on the upper ends pivotally mounted on the lower ends of the struts, said arms having spaced transversely disposed hinge sections therein, and means limiting outward movement of the arms.

4. In a seat for truck bodies and the like the combination which comprises a seat having a back, vertically disposed struts extended downwardly from the corners of the seat, outwardly and upwardly extended arms having hooks on the upper ends pivotally mounted on the lower ends of the struts, said arms having spaced transversely disposed hinge sections therein, stay bolts extending through the struts and arms, and means resiliently urging the arms outwardly away from the struts.

MARSHALL E. STONE.

REFERENCES CITED

The following references are of record in the file of this patent:

UNITED STATES PATENTS

| Number | Name | Date |
| --- | --- | --- |
| 427,454 | Barrett | May 6, 1890 |
| 1,118,762 | Hall et al. | Nov. 24, 1914 |
| 1,150,739 | Blakeslee | Aug. 17, 1915 |
| 1,335,678 | Frye | Mar. 30, 1920 |

FOREIGN PATENTS

| Number | Country | Date |
| --- | --- | --- |
| 136,064 | Germany | Nov. 13, 1902 |